United States Patent
Philipps

(10) Patent No.: US 6,712,393 B2
(45) Date of Patent: Mar. 30, 2004

(54) TUBULAR CROSSMEMBER

(75) Inventor: David Philipps, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/072,085

(22) Filed: Feb. 8, 2002

(65) Prior Publication Data

US 2003/0151242 A1 Aug. 14, 2003

(51) Int. Cl.[7] ............................................. B62D 21/06
(52) U.S. Cl. ...................... 280/794; 280/795; 280/800
(58) Field of Search ................................. 280/784, 785, 280/789, 790, 793, 794, 795, 781, 786, 800; 296/29, 30, 205; 29/897.2, 428

(56) References Cited

U.S. PATENT DOCUMENTS

| | | | |
|---|---|---|---|
| 682,901 A | 9/1901 | Barber | |
| 1,186,013 A | 6/1916 | Loring | |
| 1,349,569 A | 8/1920 | Hart | |
| 1,591,215 A | 7/1926 | Jacobs | |
| 1,841,510 A * | 1/1932 | Van Ranst | 280/794 |
| 1,953,620 A * | 4/1934 | Maddock et al. | 280/794 |
| 1,954,637 A | 4/1934 | Linn | |
| 2,112,540 A * | 4/1938 | Maddock | 280/794 |
| 2,121,007 A * | 6/1938 | Best | 280/800 |
| 2,163,694 A * | 6/1939 | Matthews et al. | 280/794 |
| 2,173,515 A * | 9/1939 | Eklund | 280/794 |
| 2,173,516 A * | 9/1939 | Eklund | 280/794 |
| 2,174,915 A * | 10/1939 | Dietricy | 280/794 |
| 2,177,991 A * | 10/1939 | Maddock | 280/794 |
| 2,229,371 A * | 1/1941 | Caayne | 280/783 |
| 2,257,835 A * | 10/1941 | Best | 280/794 |
| 2,314,603 A * | 3/1943 | Sorensen et al. | 280/794 |
| D149,830 S | 6/1948 | Nelson | |
| 2,476,664 A * | 7/1949 | Humig | 280/124.111 |
| 2,676,030 A * | 4/1954 | Sherman | 280/797 |
| 2,715,041 A * | 8/1955 | Firebaugh et al. | 296/35.1 |
| 2,739,822 A * | 3/1956 | Schilberg | 280/794 |
| 2,747,887 A * | 5/1956 | Schilberg | 280/794 |
| 2,835,506 A * | 5/1958 | Schilberg | 280/794 |
| 3,000,650 A | 9/1961 | Burrows | |
| 3,499,661 A * | 3/1970 | Rowe, Jr. | 280/794 |
| 3,643,815 A | 2/1972 | Balogh | |
| 4,903,791 A | 2/1990 | Cameron et al. | |
| 5,263,728 A * | 11/1993 | Patel et al. | 280/42 |
| 5,417,454 A | 5/1995 | Adams | |
| 5,507,522 A | 4/1996 | Ritchie | |
| 5,839,776 A | 11/1998 | Clausen et al. | |
| 6,126,199 A | 10/2000 | Valin et al. | |
| D443,848 S | 6/2001 | Fischer et al. | |
| 6,286,868 B1 | 9/2001 | von Mayenburg | |

* cited by examiner

Primary Examiner—Paul N. Dickson
Assistant Examiner—Toan C To
(74) Attorney, Agent, or Firm—Watts Hoffmann Co., LPA

(57) ABSTRACT

A tubular crossmember for a vehicle frame having spaced apart rails. The crossmember includes an "X" shaped member and two elongated members. Ends of legs of the "X" shaped member are constrained to ends of the elongated members. The two elongated members are parallel and are spaced apart by the "X" shaped member. The tubular crossmember is adapted to be connected to rails to construct a vehicle frame.

68 Claims, 7 Drawing Sheets

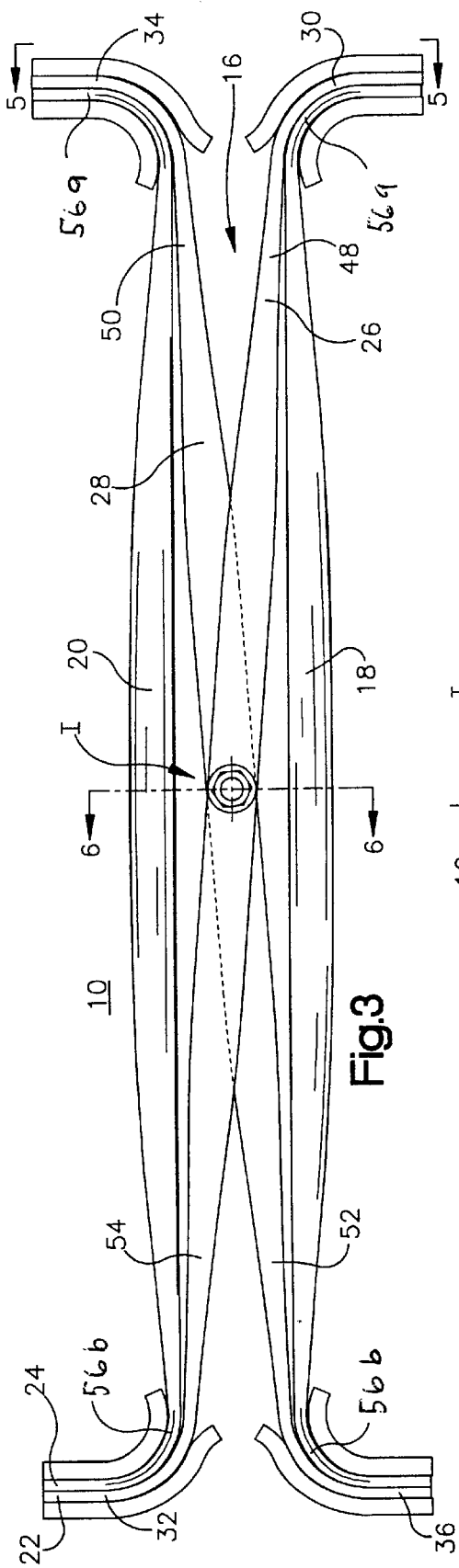

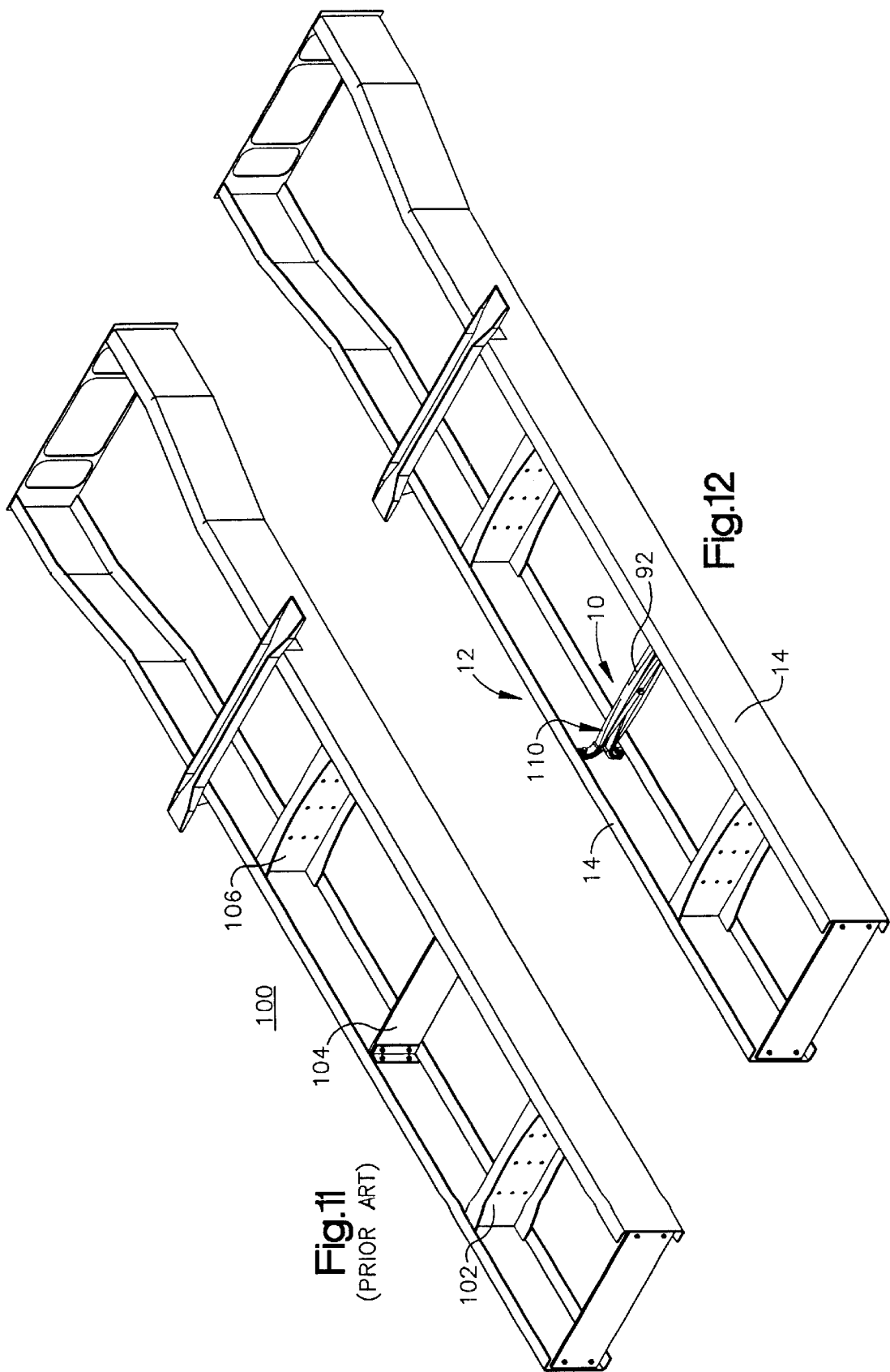

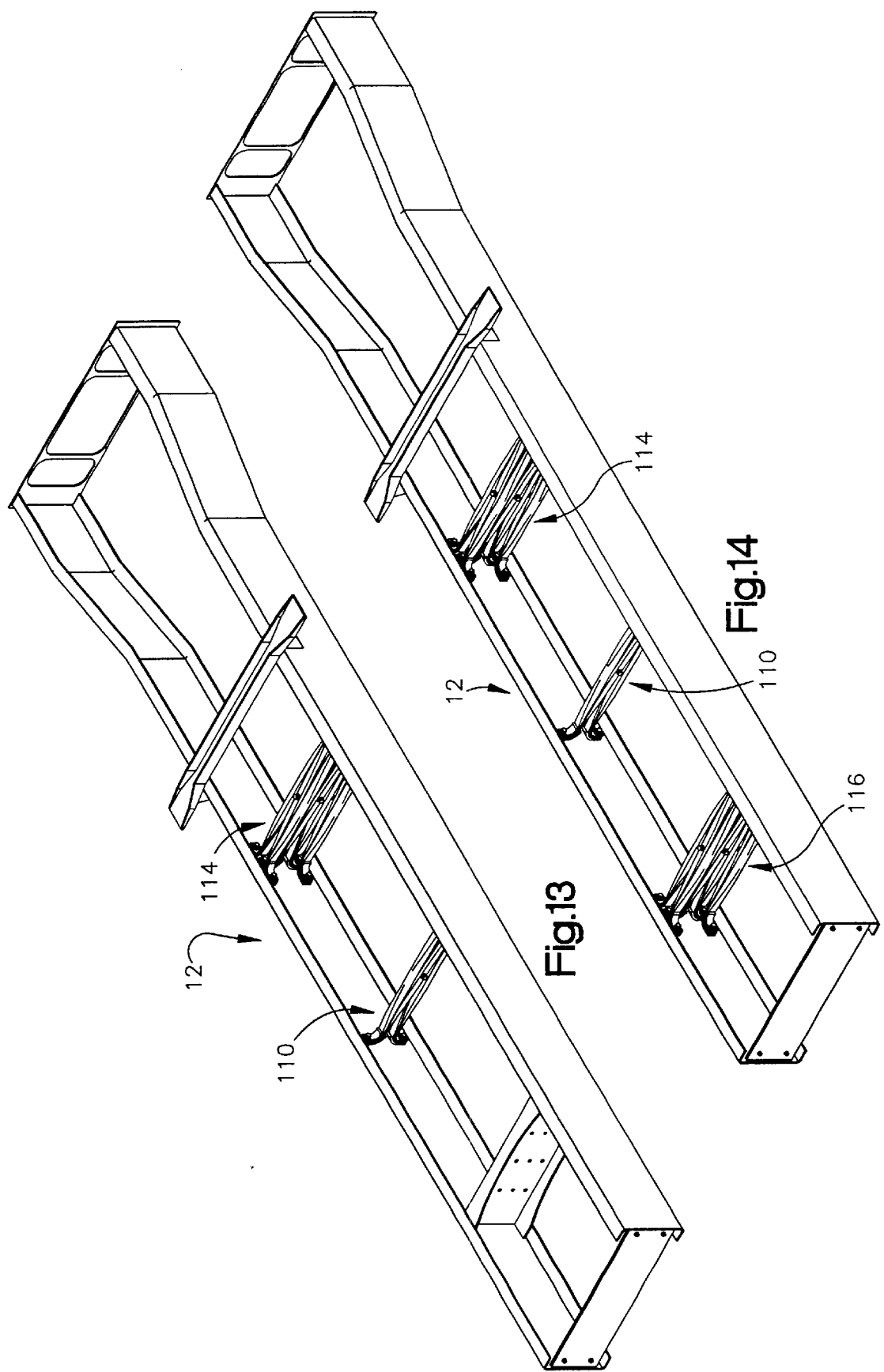

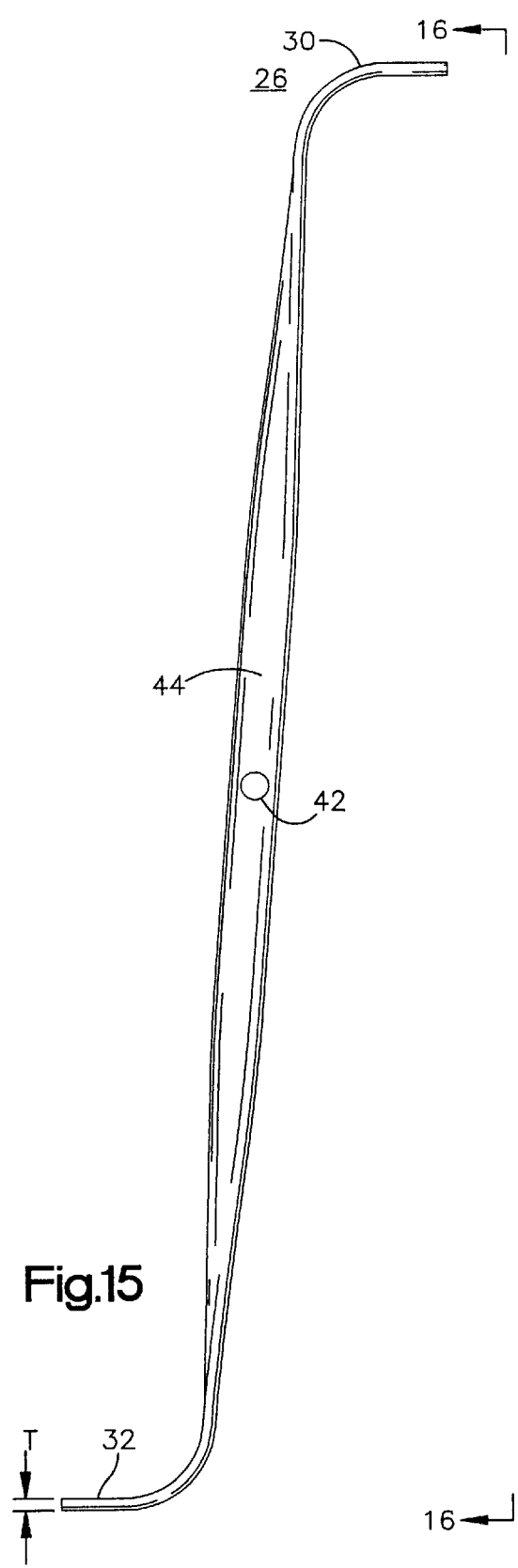
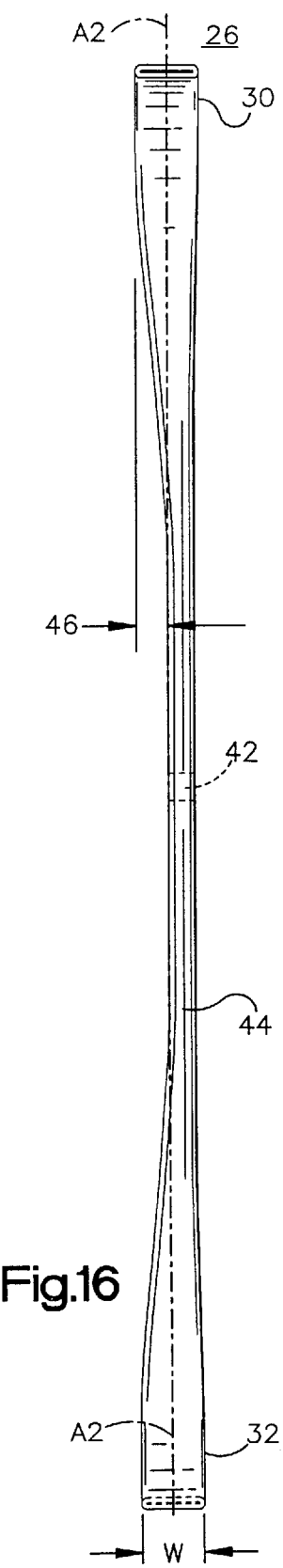
Fig.15
Fig.16

TUBULAR CROSSMEMBER

FIELD OF THE INVENTION

The present invention relates a crossmember for a vehicle frame and, more particularly, the present invention relates to a tubular crossmember for use with a pair of spaced apart C-shaped rails in the construction of a truck or tractor frame.

BACKGROUND OF THE INVENTION

Weight is one of the most important factors in the design of an over the highway truck or tractor. Fleet owners are often paid by the ton/mile. Highway regulations set maximum weights for loaded trucks and tractors. As a result, the lighter the over the highway truck or tractor is, the more profitable it is. Even a small decrease in the weight of an over the highway truck or tractor greatly increases the profitability of the truck or tractor over its life.

In over the highway trucks and tractors, it is common to use a frame that includes a pair of parallel frame rails of a C-shaped cross-section that are spaced apart by crossmembers. The C-shaped rails run longitudinally along the length of the truck. The crossmembers are attached to the side rails to form a ladder type frame. Prior art crossmembers are thick, heavy members, because they are designed to carry loads applied to the crossmember from several different directions. The additional weight of prior art crossmembers reduces the profitability of the truck.

Two types of loads applied to truck and tractor frames are the result of frame roll and parallelogramming. Frame roll is the result of an offset load applied to the frame by a bracket that supports a heavy article, such as a fuel tank, a battery box, or a suspension support. The offset load creates a torsional stress or roll in the frame. The torsional stress or roll in the frame increases as the truck or tractor is driven around a bend and along uneven roads.

Parallelogramming occurs when the truck or tractor is steered to corner tightly or when one tire of the truck or tractor hits a pothole. These conditions cause the rails of the truck frame to move longitudinally with respect to one another.

Prior art crossmembers are designed to prevent both frame roll and parallelogramming. Because prior art crossmembers are designed to carry loads applied from more than one direction the crossmembers are required to be heavy. The heavy prior art crossmembers account for a significant portion of weight to the over the highway truck or tractor.

What is needed is a crossmember that is designed to carry a load in one direction while remaining flexible in other load conditions. A crossmember that carries a load in one direction but remains flexible in other load conditions is lighter and less expensive than crossmembers designed to carry loads from multiple directions. Use of lighter crossmembers in vehicle increases the load that can be carried. As a result, the profitability of the vehicle is increased.

DISCLOSURE OF THE INVENTION

The present invention concerns a crossmember for a vehicle frame having spaced apart rails. The crossmember includes a first substantially S-shaped member that has first and second bent end portions. A second substantially S-shaped member also includes first and second bent end portions. The first and second S-shaped members are connected at an intersection of the first and second S-shaped members near longitudinal centers of the elements. A first substantially C-shaped member includes first and second bent end portions. The first bent end portion of the first C-shaped member is connected to the first bent end portion of the first S-shaped member. The second bent end portion of the first C-shaped member is connected to the second end portion of the second S-shaped member. A second substantially C-shaped member also includes a first bent end portion and second bent end portion. The first bent end portion of the second C-shaped member is connected to the first bent end portion of the second S-shaped member. The second bent end portion of the second C-shaped member is connected to the second bent end portion of the first S-shaped member.

In embodiments of the invention the first and second S-shaped members are pivotally connected. The S-shaped members and the C-shaped members are hollow tubes that are compressed at their ends. The ends of the S-shaped members and the C-shaped members are constrained between pairs of solid plates.

A vehicle frame of the present invention includes a spaced pair of rails separated by one or more tubular X-shaped crossmembers. The X-shaped crossmembers include a pair of tubular elements pivotally connected at locations near respective longitudinal centers of the elements. Each of the elements have spaced curved end portions. End anchors secure the end portions to the rails such that the X-shaped crossmembers secure the rails in a spaced relationship.

The crossmember connection that is used to connect the tubular crossmember to rails of the vehicle frame includes an outer plate and an inner plate. The outer plate includes a flat portion that mates with the frame rail and a curved portion that conforms to the tubular crossmember. The inner plate includes a flat and curved portions that conform to the tubular crossmember. The end portions of the tubular members of the crossmember is held between the inner plate and the outer plate which absorb forces and moments that would otherwise be absorbed by the tubular members. The curved portions of the inner and outer plates extend away from the tubular members.

In an embodiment of the invention, the curved portion of the inner plate has a radius of curvature that is less than a radius of curvature of a bend of the tubular member. The curved portion of the outer plate includes a first bend generally conformed to a bend of the tubular member and a second bend that curves away from the tubular member. The inner and outer plates include mounting holes that are in alignment with mounting holes in the bent end portions of the tubular members of the crossmember.

The tubular crossmember of the present invention is designed to withstand a load in one direction while remaining flexible in other load directions. The single direction load absorbing design of the present invention minimizes crossmember weight, expense and optimizes material placement. Reduction in the weight of the frame results in increased revenue produced by the truck over the life of the truck. The use of several of the crossmembers of the present invention produces an efficient crossed truss structure between the rails. The truss structure is efficient in carrying only tensile compressive forces in the tubular member.

The crossmember connection of the present invention transfers loads from the truss to the bolts with plates that are added only to the ends of the crossmember to carry bending and shear forces. The small plates carry the bending moments of the crossmembers and add little weight to the crossmember.

The disclosed crossmember design efficiently carries moment and shear forces in the plane of the tube sections.

The disclosed crossmember is flexible in other load directions such that it easily conforms and does not increase stresses in the mounting brackets. The shape of the single direction crossmember allows a horizontal crossmember to be placed above and below a vertical crossmember with all of the bolts at the same height on the rail. The crossmember of the present invention is less expensive than traditional crossmembers and is much lighter. It is optimized to carry load in one direction. The center tubes carry only tension and compression in a truss system. The tubes of the crossmember are efficient to prevent buckling. The tubular members are easily compressed at their ends to accommodate mounting. High bending stress is carried by the thick connection plates. The crossmember is very flexible in frame torsion and out of plain loads and has a very small footprint on the frame.

These and other advantages of the present invention will become apparent upon reading the following detailed description in view of the drawings.

BRIEF DESCRIPTION OF THE DRAWINGS

FIG. 3 is a top plan view of a cross member constructed in accordance with the present invention;

FIG. 4 is a side elevational view of a cross member constructed in accordance with the present invention;

FIG. 5 is an end view taken across lines 5—5 of FIG. 3 of a cross member constructed in accordance with the present invention;

FIG. 6 is a sectional view taken across lines 6—6 of FIG. 3;

FIG. 11 is a perspective view of a prior art truck frame;

FIG. 12 is a truck frame of the present invention including an intermediate tubular cross member;

FIG. 13 is a truck frame of the present invention including an intermediate tubular cross member and a gear box tubular cross member;

FIG. 14 is a truck frame of the present invention including horizontal and vertical tubular cross members;

FIG. 15 is a top plan view of an S-shaped tubular member; and,

FIG. 16 is a side elevational view of an S-shaped tubular member.

BEST MODE FOR CARRYING OUT THE INVENTION

Figure 1:
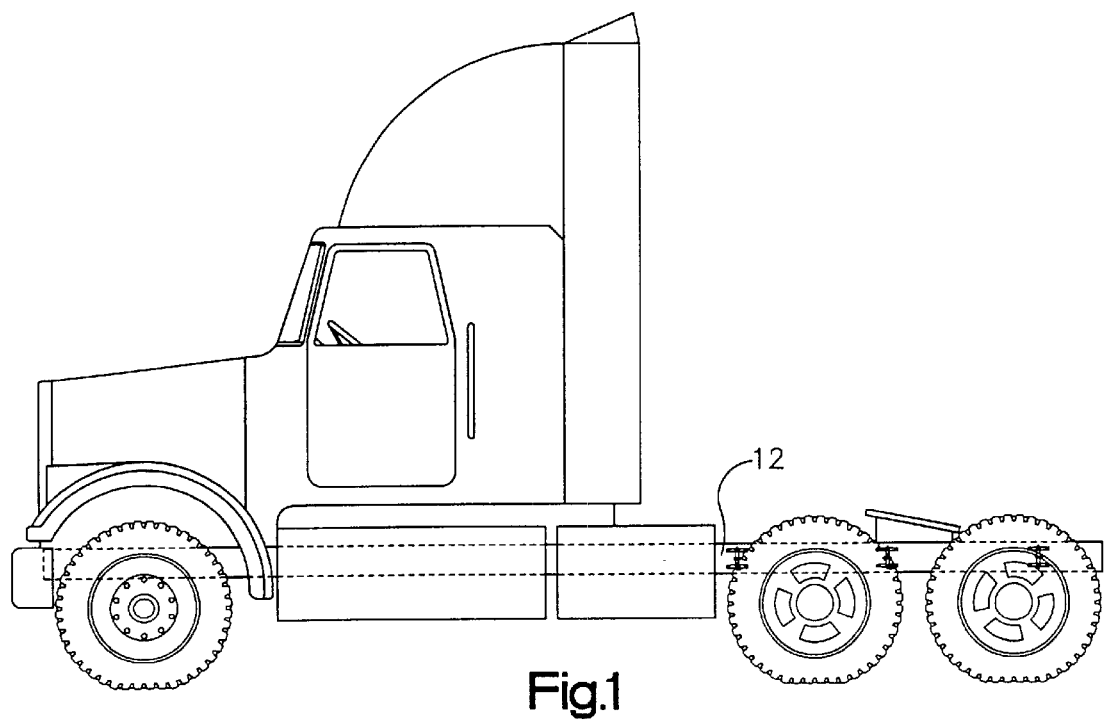
FIG. 1 is a side elevational view of a tractor including the novel and improved frame of this invention.

The present disclosure is directed to a cross member 10 for a vehicle frame 12 having spaced apart rails 14. The illustrated cross member 10 includes an X-shaped member 16 and first and second elongated tubular members 18, 20. In the illustrated embodiment, the first and second elongated tubular members are connected to the X-shaped tubular member 16, are spaced apart by the X-shaped tubular member 16 and are parallel to one another. In the illustrated embodiment, ends 22 of the X-shaped member 16 are connected to ends 24 of the elongated tubular members 18, 20.

Referring to FIGS. 2–6, the illustrated X-shaped member 16 includes first and second S-shaped tubular members 26, 28. The first S-shaped tubular member 26 includes a first bent end portion 30 and a second bent end portion 32 bent away from the first end portion 30. In the illustrated embodiment, the first and second bent end portions 30, 32 are flattened to facilitate connection to the ends 24 of the elongated tubular members 18, 20. The second S-shaped tubular member 28 includes a first bent end portion 34 and a second bent end portion 36 bent away from the first end portion 34. The bent end portions 34, 36 of the second S-shaped tubular member 32 are flattened to facilitate connection to ends 24 of the elongated tubular members. The first and second S-shaped tubular members 26, 28 are connected at an intersection I of the first and second S-shaped tubular members 26, 28. In the illustrated embodiment, the first and second S-shaped tubular members 26, 28 are connected by a flange bolt 38 and lock nut 40 that passes through a hole 42 (FIGS. 15 and 16) in each of the first and second S-shaped tubular members 26, 28.

Referring to FIGS. 15 and 16, in the illustrated embodiment, the first and second S-shaped tubular members 26, 28 are substantially identical. The second S-shaped tubular member 28 is simply flipped over and connected to the first S-shaped tubular member 26 to form the X-shaped member 16. The thickness T and width W of the S-shaped tubular members 26, 28 varies along the length of the S-shaped tubular members. In the illustrated embodiment, end portions of the S-shaped tubular member 26 are flattened creating an end portion 30, 32 having a relatively large width W and a relatively small thickness T. The end portions 30, 32 of the S-shaped tubular member 26 transition to a central portion 44 having a width W that is less than the width of the end portions 30, 32 and a thickness T that is greater than the thickness of the end portions 30, 32. The end portions 30, 32 are substantially aligned along an axis A2 in the illustrated embodiment. The central portion 44 is off-set with respect to the end portions 30, 32. The off-set 46 allows the same S-shaped tubular member to be used as the first and second S-shaped tubular members 26, 28. In the exemplary embodiment, the S-shaped tubular members are made from a hollow tube having an initially constant diameter. The tube is compressed to form the illustrated S-shaped tubular members.

Figure 2:
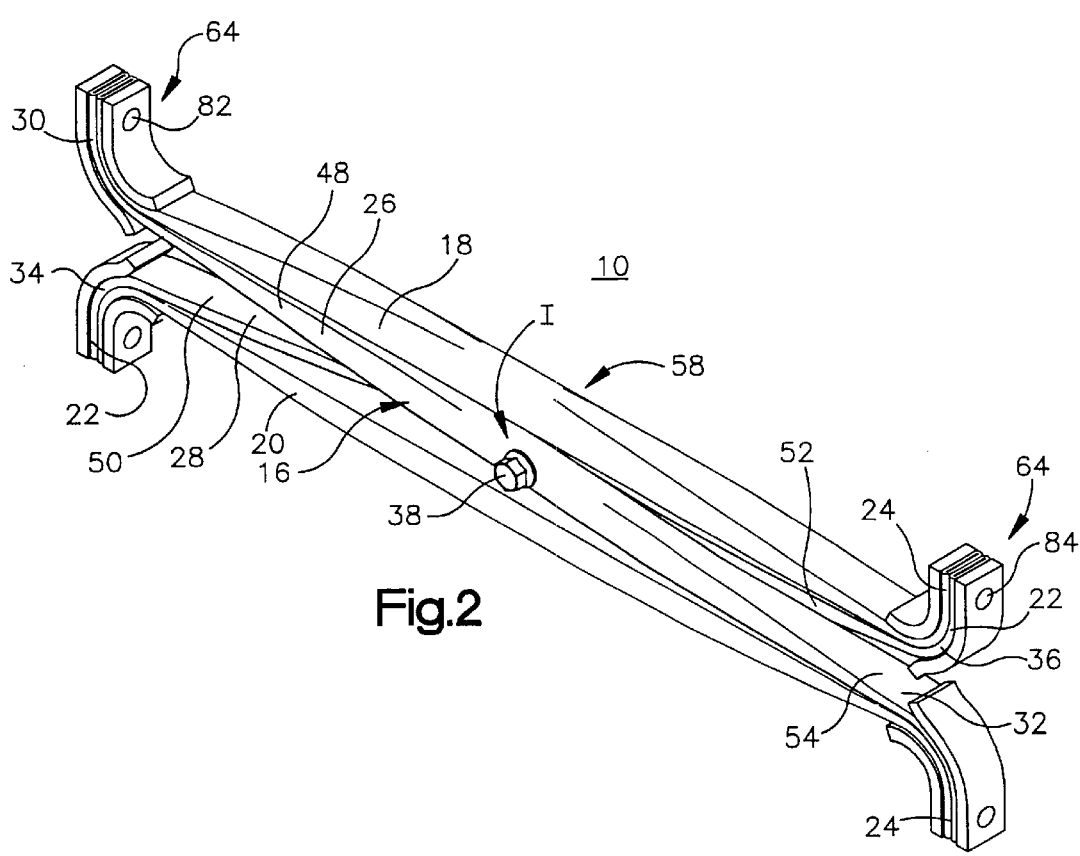
FIG. 2 is a perspective view of a cross member constructed in accordance with the present invention.

Referring to FIGS. 2 and 3, the first and second S-shaped tubular members 26, 28 may be fastened together by a flange bolt 38 and a lock nut 40, or any other means of fixing the members together to form the X-shaped tubular member 16. The illustrated X-shaped tubular member 16 has a first leg 48 with a first bent end portion 30, a second leg 50 with a second bent end portion 34, a third leg 52 with a third bent end portion 36 and a fourth leg 54 with a fourth bent end portion 32. The first end portion 30 is bent away from the second end portion 34 and the third bent end portion 36 is bent away from the fourth bent end portion 32 of the X-shaped tubular member.

Referring to FIG. 3, the elongated tubular members 18, 20 are connected to the legs 48, 50, 52, 54 of the X-shaped tubular member. In the illustrated embodiment, the first and second elongated tubular members 18, 20 are identical. The elongated tubular members 18, 20 each include bent end portions 56a, 56b that are bent in generally the same direction creating a substantially C-shaped member. The thickness and width of the elongated tubular members 18 varies along the length of the elongated tubular member. In the illustrated embodiment, the bent end portions 56a, 56b of the elongated tubular members are flattened or compressed to facilitate connection to the ends 22 of the X-shaped member 16. A central portion 58 of the tubular member 18 is thicker than the end portions 56a, 56b, but less wide than the end portions 56a, 56b to strengthen the elongated tubular member 18. In the illustrated embodiment, the elongated tubular members are made from a tube (not shown) that initially has a substantially constant diameter. Portions of the tube are compressed to create the illustrated tube.

Referring to FIG. 3, in the illustrated embodiment, the first bent end portion 56a of the first elongated tubular member 18 is connected to the first bent end portion 30 of the first S-shaped tubular member 26 and the second bent end portion 56b of the first elongated tubular member 18 is connected to the second bent end portion 36 of the second S-shaped tubular member 28. The first bent end portion 56a of the second elongated tubular member 20 is connected to the first bent end portion 34 of the second S-shaped tubular member 28 and the second bent end portion 56b of the second elongated tubular member 20 is connected to the second bent end portion 32 of the first S-shaped tubular member 26. In the exemplary embodiment, each of the bent end portions 30, 32, 34, 36 of the S-shaped tubular members 24, 26 includes a hole (not shown) in alignment with a hole (not shown) in the bent end portions 56a, 56b of the first and second elongated tubular members 18, 20. The holes facilitate connection of the first and second elongated tubular members 18, 20 to the X-shaped member 16.

Figure 7:
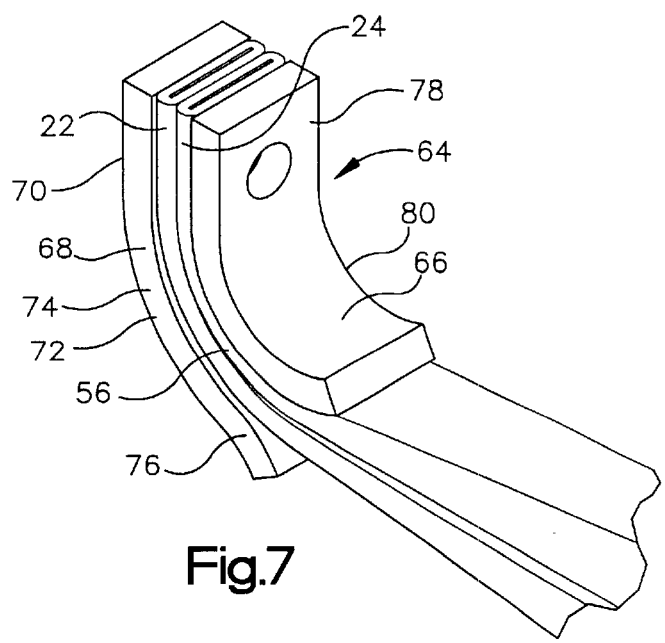
FIG. 7 is an enlarged perspective view of a cross member connection constructed in accordance with the present invention.

Referring to FIGS. 2 and 7, in the illustrated embodiment, plates 64 are used to strengthen the cross member 10 at each connection between and end 22 of the X-shaped member 16 and an end 24 of an elongated tubular member.

Referring to FIG. 7, each pair of X-shaped member end is held to an elongated tubular member end between an inner plate 66 and an outer plate 68. The outer plate 68 includes a flat portion 70 and a curved portion 72. In the illustrated embodiment, the flat portion 70 conforms to a generally flat portion of an end 22 of the X-shaped member 16. The curved portion 72 includes a first bend 74 that generally conforms to a bent end portion of the X-shaped member 16 and a second bend 76 that curves away from the X-shaped tubular member 16. The inner plate 66 includes a flat portion 78 and a curved portion 80. The flat portion 78 generally conforms to a flattened portion of an end 24 of an elongated tubular member 18. The curved portion 80 of the inner plate 66 is defined by a radius of curvature that is less than the radius of curvature of a bent end portion 56 of an elongated tubular member.

The plates 64 absorb the majority of forces and moments applied to the end portions 22, 24 of the X-shaped member and the elongated tubular members. The weight of the cross member 10 is significantly reduced by placing solid plates only at the ends of the cross member.

In the illustrated embodiment, the inner plate 66 and the outer plate 68 each include a hole 82, 84 that are in alignment with the holes in the ends 22, 24 of the X-shaped member and the elongated tubular member.

Figure 8:
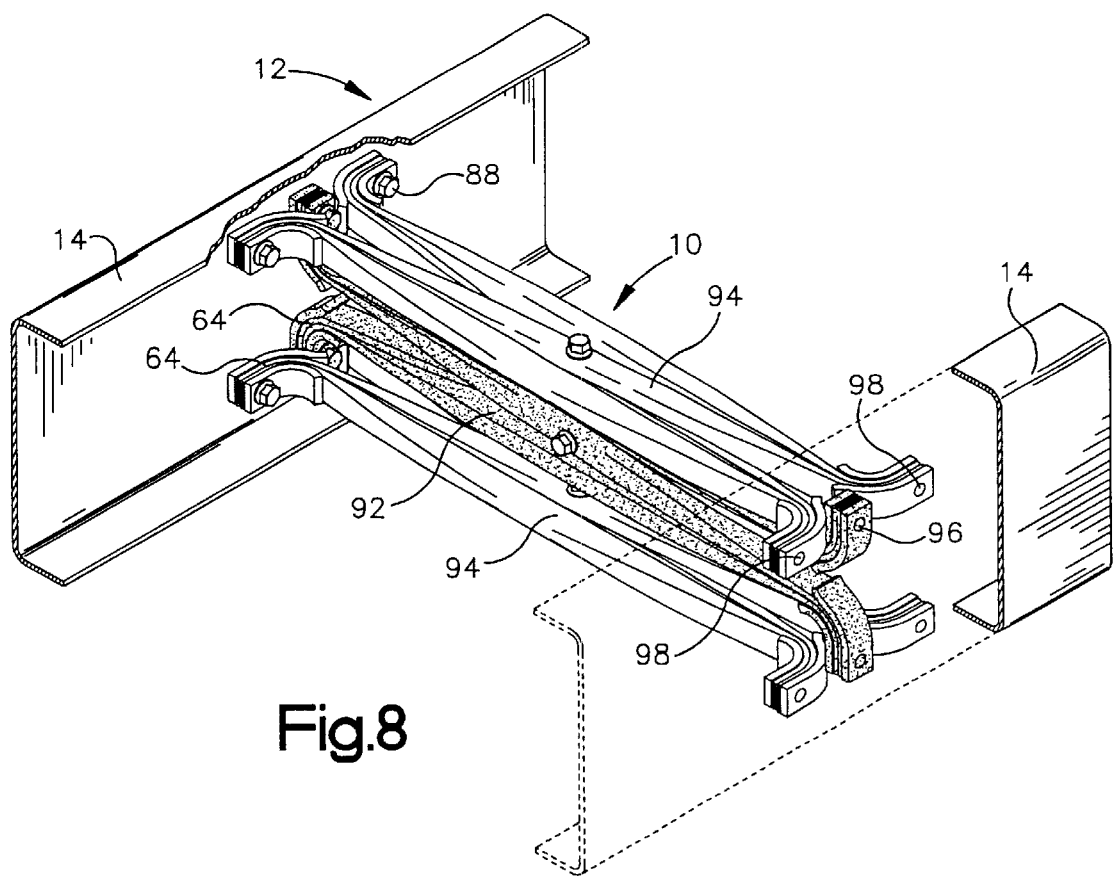
FIG. 8 is a perspective view of a portion of a truck frame constructed in accordance with the present invention.

Referring now to FIGS. 8–10 and 12–14, the illustrated crossmembers 10 are connected to rails 14 to construct vehicle frames. In the illustrated embodiment, the crossmembers 10 are connected to the rails 14 with bolts 88. It should be apparent to those skilled in the art that any means of fastening may be used to connect the crossmembers 10 to the rails 14 of the frame 12. Referring to FIG. 8, vertically oriented crossmembers are placed along the vehicle frame where frame roll is to be reduced. Loads from the fuel tank, battery box and frame, offset forces from suspension brackets under gravity and dynamic forces contribute to frame roll. Horizontally oriented crossmembers 94 are positioned along the frame to prevent parallelogramming. Loads on the frame from FIG. 8 turning and encountering potholes to cause parallelogramming.

Figure 9:
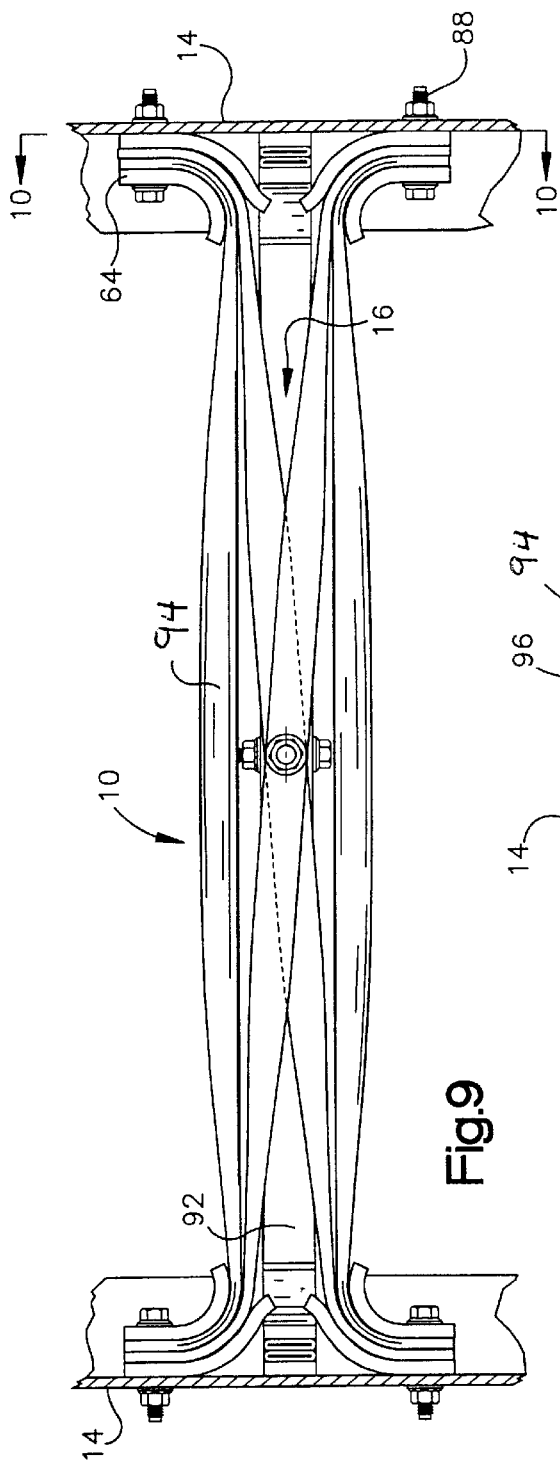
FIG. 9 is a top plan view, partially in section, of a truck frame constructed in accordance with the present invention.
Figure 10:
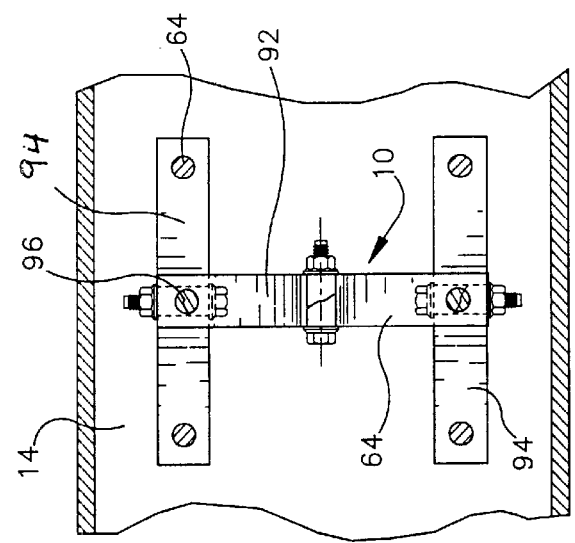
FIG. 10 is a sectional view taken across lines 10—10 of FIG. 9.

In the exemplary embodiment, individual crossmembers 10 can be placed along the rails 14 of the vehicle frame to add strength when necessary. Referring to FIGS. 8–10, the illustrated crossmembers 10 can be nested to provide resistance to both frame roll and parallelogramming at a given location of the vehicle frame. In the embodiment illustrated in FIGS. 8, 9 and 10, one vertically oriented crossmember 92 is nested between two horizontally oriented crossmembers 94. The mounting plates 64 of the vertically oriented crossmember 92 fit between the mounting plate 64 of the horizontally oriented crossmember 94. Mounting hole 96 of the vertically oriented crossmember 92 are horizontally aligned with mounting holes 98 of the upper horizontally oriented member 94. Aligning the mounting holes of the vertically oriented crossmember 92 and horizontally oriented crossmember 94 eases assembly of nested crossmembers as shown in FIGS. 8–10.

FIG. 11 illustrates a typical vehicle frame 100. The typical vehicle frame 100 includes a boggie crossmember 102, an intermediate crossmember 104, a gear box crossmember 106, along with other crossmembers.

In the exemplary embodiment, one or more crossmembers of a typical vehicle frame 100 are replaced with crossmembers 10 of this disclosure. The crossmembers 10 could be used to replace the intermediate, gear box and boggie crossmembers by using a system of vertical and horizontal tubular crossmembers. FIG. 12 illustrates a vehicle frame 12 having an intermediate tubular crossmember 110. FIG. 13 illustrates a vehicle frame 112 having an intermediate vertical tubular crossmember 110 and a gear box tubular crossmember 114 that comprises vertically oriented crossmembers 92 nested with two horizontally oriented crossmembers 94. FIG. 14 illustrates a frame 116 having an intermediate vertical tubular crossmember 110 and vertical and horizontal tubular crossmembers placed as the gear box tubular crossmember 114, and boggie crossmember 116.

The crossmembers 10 of the present disclosure are very strong and lightweight. Each crossmember 10 absorbs load primarily in one direction. The decreased weight of the crossmember 10 reduces the overall weight of the truck thereby increasing the load that can be carried by the truck and the profitability of the truck over the life of the truck. The crossmembers 10 are less expensive than traditional crossmembers.

Although the present invention has been described with a degree of particularity, it is the intent that the invention include all modifications and alterations falling within the spirit and scope of the following claims.

I claim:

1. A crossmember connection for connecting a tubular crossmember to rails of a vehicle frame, comprising:
   a) an outer plate including a flat portion and a curved portion; and
   b) an inner plate including a flat portion and a curved portion, such tubular crossmember including a bent tubular member having an end portion held between said inner plate and said outer plate and an elongated portion extending transversely from said end portion, said curved portions of said inner and outer plate plates extending away from said tubular member.

2. The connection of claim 1 further comprising a second bent tubular member held between said inner and outer plates.

3. The connection of claim 1 wherein the curved portion of the inner plate has a radius of curvature that is less than a radius of curvature of a bend of the tubular member and the curved portion of the outer plate includes a first bend that generally conforms to a bend of the tubular member and a second bend that curves away from said tubular member.

4. The connection of claim 1 wherein said outer plate includes a mounting hole, said bent tubular member includes a mounting hole in alignment with the outer plate mounting hole and the inner plate includes a mounting hole in alignment with the tubular member mounting hole.

5. A tubular crossmember for connection to rails of a vehicle frame, comprising:
   a) an outer load absorbing plate including a flat portion, a curved portion and a mounting hole;
   b) a first bent tubular member having an end portion adjacent to said outer plate and a mounting hole in alignment with said outer plate mounting hole, said curved portion of said outer plate including a first bend that generally conforms to a bend of the first tubular member and a second bend that curves away from the first tubular member;
   c) a second bent tubular member having an end portion adjacent to said first bent tubular member and a mounting hole in alignment with said first bent tubular member mounting hole;
   d) an inner load absorbing plate adjacent to said second bent tubular portion including a flat portion, a curved portion and a mounting hole in alignment with said second bent tubular member mounting hole, said curved portion of said inner plate having a radius of curvature that is less than a radius of curvature of a bend of said second bent tubular member.

6. A crossmember for a vehicle frame having spaced apart rails, comprising:
   a) A first tubular member including a first bent end portion and a second end portion bent away from said first end portion;
   b) a second tubular member intersecting said first tubular member, said second member including a first bent end portion and a second end portion bent away from said first end portion, said second member being connected to said first member at an intersection of the first and second members;
   c) a third tubular member having a first bent end portion connected to said first bent end portion of said first tubular member and a second bent end portion connected to said second bent end portion of said second tubular member; and,
   d) a fourth tubular member having a first bent end portion connected to said second bent end portion of said first tubular member and a second bent end portion connected to said first bent end portion of said second tubular member.

7. The crossmember of claim 6 wherein said first and second members are pivotally connected.

8. The crossmember of claim 6 wherein said first and second members are connected by a screw that extends through a hole in said first member and a hole in said second member.

9. The crossmember of claim 6 wherein said end portion of said tubular members are substantially flat.

10. The crossmember of claim 6 wherein said first bent end portion of said first member and said first bent end portion of said third member are constrained between first and second solid plates.

11. The crossmember of claim 10 wherein said first and second solid plates are bent away from said first end portion of said first member and said first end portion of said third member.

12. The crossmember of claim 10 wherein said first solid plate includes a bend having a radius of curvature that is less than a radius of curvature of a bend of said third member, and said second plate includes a first bend that generally conforms to said first member and a second bend away from said first member.

13. A crossmember for a vehicle frame having spaced apart rails, comprising:
   a) A first tubular member including a first bent end portion and a second end portion bent away from said first end portion;
   b) a second tubular member intersecting said first tubular member, said second member including a first bent end portion and a second end portion bent away from said first end portion, said second member being connected to said first member at the intersection of the first and second members;
   c) a third tubular member having first bent end portion and a second end portion bent in generally the same direction as said first bent end portion;
   d) a fourth tubular member having a first bent end portion and a second end portion bent in generally the same direction as said first bend end portion;
   e) a first pair of plates, each plate including a flat portion and a curved portion, said first end portion of said first member and said first end portion of said third member being constrained between said first pair of plates;
   f) a second pair of plates, each plate including a flat portion and a curved portion, said first end portion of said second member and said first end portion of said fourth member being constrained between said second pair of plates;
   g) a third pair of plates, each plate including a flat portion and a curved portion, said second end portion of said first member and said second end portion of said fourth member being constrained between said third pair of plates; and,
   h) a fourth pair of plates, each plate including a flat portion and a curved portion, said second end portion of said second member and said second end portion of said third member being constrained between said fourth pair of plates.

14. The apparatus of claim 13 wherein said first and second members are pivotally connected.

15. The apparatus of claim 13 wherein said end portions of the tubular members are substantially flat.

16. The apparatus of claim 13 wherein a first plate of said first pair of plates is bent away from said first end portion of said first member and a second plate of said first pair is bent away from said first end portion of said third member.

17. The apparatus of claim 13 wherein a first plate of said first pair of plates has a radius of curvature that is less than a radius of curvature of a bend of said third member and a second plate of said first pair includes a first bend that generally conforms to said first member and a second bend away from said first member.

18. A crossmember for a vehicle frame having spaced apart rails, comprising:
   a) a first substantially "S" shaped member having first and second end portions;
   b) a second substantially "S" shaped member having first and second end portions, said first and second members being connected at an intersection of said first and second members;
   c) a first substantially "C" shaped member having a first end portion connected to the first end portion of said first substantially "S" shaped member and a second end portion connected to said second end portion of said second substantially "S" shaped member; and,
   d) a second substantially "C" shaped member having a first end portion connected to said first end portion of said second substantially "S" shaped member and a second end portion connected to said second end portion of said first substantially "S" shaped member.

19. The apparatus of claim 18 wherein said first and second substantially "S" shaped members are pivotally connected.

20. The apparatus of claim 18 wherein said first and second substantially "S" shaped members and said first and second substantially "C" shaped members are tubular members.

21. The apparatus of claim 20 wherein said end portions of said substantially "S" shaped members and said substantially "C" shaped members are flat.

22. The apparatus of claim 18 wherein said first end portion of said first substantially "S" shaped member and said first end portion of said first substantially "C" shaped member are constrained between first and second solid plates.

23. The apparatus of claim 22 wherein said first and second solid plates are bent away from said first end portions of said substantially "S" shaped member and said substantially "C" shaped member.

24. The apparatus of claim 22 wherein said first solid plate includes a bend having a radius of curvature that is less than a radius of curvature of a bend of said first substantially "C" shaped member and said second plate includes a first bend that generally conforms to said first substantially "S" shaped member and a second bend away from said first substantially "S" shaped member.

25. A crossmember for a vehicle frame having spaced apart rails comprising:
   a) a first tubular substantially "S" shaped member having a middle portion, a first bent end portion, and a second bent end portion;
   b) a second tubular substantially "S" shaped member being pivotally connected at an intersection of said middle portions;
   c) a first substantially "C" shaped member having a first bent end portion and a second bent end portion;
   d) a second substantially "C" shaped member having a first bent end portion and a second bent end portion;
   e) a first pair of load absorbing plates, said first end portion of said first substantially "S" shaped member and said first end portion of said first substantially "C" shaped member being constrained between said first pair of plates;
   f) a second pair of load absorbing plates, said first end portion of said second substantially "S" shaped member and said first end portion of said second substantially "C" shaped member being constrained between said second pair of plates;
   g) a third pair of load absorbing plates, said second end portion of said first substantially "S" shaped member and said second end portion of said second substantially "C" shaped member being constrained between said third pair of plates; and,
   h) a fourth pair of load absorbing substantially said second end portion of said second substantially "S" shaped member and said second end portion of said first substantially "C" shaped member being constrained between said fourth pair of torsion absorbing plates.

26. A crossmember for a vehicle frame having spaced apart rails, comprising:
   a) an "X" shaped tubular member comprising a first tubular member having a first leg with a first bent end portion, a second leg with a second end portion bent away from said first bent end portion, said first tubular member connected to a second tubular member having a third leg with a third bent end portion and a fourth leg with a fourth end portion bent away from said third end;
   b) a first elongated tubular member having a first end portion connected to said first leg and a second end portion connected to said third leg; and,
   c) a second elongated tubular member parallel to said first elongated tubular member having a first end portion constrained to said second leg and a second end portion connected to said fourth leg.

27. The crossmember of claim 26 wherein said first and second tubular members are pivotally connected.

28. The crossmember of claim 26 wherein said bent end portions of said "X" shaped tubular member are substantially flat.

29. The crossmember of claim 26 wherein said bent end portions of said "X" shaped tubular members are each constrained between a pair of solid plates.

30. The crossmember of claim 26 wherein said first bent end portion is constrained between a first solid plate and a second solid plate, said first solid plate includes a bend having a radius of curvature that is less than a radius of curvature of a bend of said first bent end, said second solid plate includes a first bend that generally conforms to said first bent end portion and a second bend away from said bend of said first bent end portion.

31. A crossmember for a vehicle frame having spaced apart rails, comprising:
   a) an "X" shaped tubular member having a first leg with a first bent end portion, a second leg with a second end portion bent away from said first end portion, a third leg with a third bent end portion and a fourth leg with a fourth end portion bent away from said third end portion;
   b) a first elongated tubular member having a first bent end portion adjacent to said first bent end portion of said first leg and a second bent end portion adjacent to said second bent end portion of said second leg;
   c) a second elongated tubular member having a first bent end portion adjacent to said third bent end portion of said third leg and a second bent end portion adjacent to said bent end portion of said fourth leg;
   d) a first pair of load absorbing plates, said first bent end portion of said first elongated member and said end portion of said first leg being constrained between said first pair of plates;
   e) a second pair of plates, said second bent end portion of said first elongated member and said end portion of said third leg being constrained between said second pair of plates;

f) a third pair of load absorbing plates, said first bent end portion of said second elongated member and said end portion of said second leg being constrained between said third pair of plates; and, g) a fourth pair of load absorbing plates, said second bent end portion of said second elongated member and said end portion of said fourth leg being constrained between said fourth pair of plates.

32. A truck frame comprising:

a) A first tubular member including a first bent end portion and a second end portion bent away from said first end portion;

b) a second tubular member intersecting said first tubular member, said second member including a first bent end portion and a second end portion bent away from said first end portion, said second member being connected to said first member at the intersection of the first and second members;

c) a third tubular member having a first bent end portion connected to said first bent end portion of said first tubular member and a second bent end portion connected to said second bent end portion of said second tubular member;

d) a fourth tubular member having a first bent end portion connected to said first bent end portion of said second tubular member and a second bent end portion connected to said second bent end portion of said first tubular member;

e) a first rail connected to said first end portion of said first member and said first end portion of said second member; and f) a second rail connected to said second end portion of said first member and said second end portion of said second member.

33. The apparatus of claim 32 wherein said first and second members are pivotally connected.

34. The frame of claim 32 wherein said end portions of said tubular members are substantially flat.

35. The frame of claim 32 wherein said first bent end portion of said first member and said first bent end of said third member are constrained between first and second solid plates.

36. The frame of claim 32 wherein said first and second solid plates are bent away from said first end portion of said first member and said first end portion of said third member.

37. The frame of claim 32 wherein said first solid plate includes a bend having a radius of curvature that is less than a radius of curvature of a bend of said third member, and said second plate includes a first bend that generally conforms to said first member and a second bend away from said first member.

38. A truck frame comprising:

a) A first tubular member including a first bent end portion and a second end portion bent away from said first end portion;

b) a second tubular member intersecting said first tubular member, said second member including a first bent end portion and a second end portion bent away from said first end portion, said second member being connected to said first member at the intersection of the first and second members;

c) a third tubular member having first bent end portion and a second end portion bent in generally the same direction as said first bent end portion;

d) a fourth tubular member having a first bent end portion and a second end portion bent in generally the same direction as said first bend end portion;

e) a first pair of plates, each plate including a flat portion and a curved portion, said first end portion of said first member and said first end portion of said third member being constrained between said first pair of plates;

f) a second pair of plates, each plate including a flat portion and a curved portion, said first end portion of said second member and said first end portion of said fourth member being constrained between said second pair of plates;

g) a third pair of plates, each plate including a flat portion and a curved portion, said second end portion of said first member and said second end portion of said fourth member being constrained between said third pair of plates;

h) a fourth pair of plates, each plate including a flat portion and a curved portion, said second end portion of said second member and said second end portion of said third member being constrained between said fourth pair of plates;

i) a first rail connected to said first pair of plates and said second pair of plates; and j) a second rail connected to said third pair of plates and said fourth pair of plates.

39. The frame of claim 38 wherein said first and second members are pivotally connected.

40. The frame of claim 38 wherein a first plate of said first pair of plates is bent away from said first end portion of said first member and a second plate of said first pair is bent away from said first end portion of said third member.

41. The frame of claim 38 wherein a first plate of said first pair of plates has a radius of curvature that is less than a radius of curvature of a bend of said third member and a second plate of said first pair includes a first bend that generally conforms to said first member and a second bend away from said first member.

42. A truck frame comprising:

a) a first substantially "S" shaped member having first and second end portions;

b) a second substantially "S" shaped member having first and second end portions, said first and second members being connected at an intersection of said first and second members;

c) a first substantially "C" shaped member having a first end portion connected to the first end portion of said first substantially "S" shaped member and a second end portion connected to said second end portion of said second substantially "S" shaped member;

d) a second substantially "C" shaped member having a first end portion connected to said first end portion of said second substantially "S" shaped member and a second end portion connected to said second end portion of said first substantially "S" shaped member;

e) a first rail connected to said first end portion of said first substantially "S" shaped member and said first end portion of said second substantially "S" shaped member; and f) a second rail connected to said second end portion of said first substantially "S" shaped member and said second end portion of said second substantially "S" shaped member.

43. The frame of claim 42 wherein said first and second substantially "S" shaped members are pivotally connected.

44. The frame of claim 42 wherein said first and second substantially "S" shaped members and said first and second substantially "C" shaped members are tubular members.

45. The frame of claim 42 wherein said end portions of said substantially "S" shaped members and said substantially "C" shaped members are flat.

46. The frame of claim 42 wherein said first end portion of said first substantially "S" shaped member and said first end portion of said first substantially "C" shaped member are constrained between first and second solid plates.

47. The apparatus of claim 46 wherein said first and second solid plates are bent away from said first end portions of said substantially "S" shaped member and said substantially "C" shaped member.

48. The apparatus of claim 46 wherein said first solid plate includes a bend having a radius of curvature that is less than a radius of curvature of a bend of said first substantially "C" shaped member and said second plate includes a first bend that generally conforms to said first substantially "S" shaped member and a second bend away from said first substantially "S" shaped member.

49. A truck frame comprising:
   a) a first tubular substantially "S" shaped member having a middle portion a first bent end portion and a second bent end portion;
   b) a second tubular substantially "S" shaped member having a middle portion, a first bent end portion and a second bent end portion being pivotally connected at an intersection of said middle portions;
   c) a first substantially "C" shaped member having a first bent end portion and a second bent end portion;
   d) a second substantially "C" shaped member having a first bent end portion and a second bent end portion;
   e) a first pair of load absorbing plates, said first end portion of said first substantially "S" shaped member and said first end portion of said first substantially "C" shaped member being constrained between said first pair of plates;
   f) a second pair of load absorbing plates, said first end portion of said second substantially "S" shaped member and said first end portion of said second substantially "C" shaped member being constrained between said second pair of plates;
   g) a third pair of load absorbing plates, said second end portion of said second substantially "S" shaped member and said second end portion of said first substantially "C" shaped member being constrained between said third pair of plates;
   h) a fourth pair of load absorbing plates, said second end portion of said first substantially "S" shaped member and said second end portion of said second substantially "C" shaped member being constrained between said fourth pair of torsion absorbing plates;
   i) a first rail connected to said first pair of plates and said second pair of plates; and
   j) a second rail connected to said third pair of plates and said fourth pair of plates.

50. A truck frame comprising:
   a) an "X" shaped tubular member comprising a first tubular member having a first leg with a first bent end portion, a second leg with a second end portion bent away from said first bent end portion, said first tubular member connected to a second tubular member having a third leg with a third bent end portion and a fourth leg with a fourth end portion bent away from said third end portion;
   b) a first elongated tubular member having a first end portion connected to said first leg and a second end portion connected to said third leg;
   c) a second elongated tubular member parallel to said first elongated tubular member having a first end portion constrained to said second leg and a second end portion connected to said fourth leg;
   d) a first rail connected to said first and second bent end portions of said "X" shaped member; and
   e) a second rail connected to said third and fourth bent end portions of said "X" shaped member.

51. The frame of claim 50 wherein said first and second tubular members are pivotally connected.

52. The frame of claim 50 wherein said bent ends of said "X" shaped tubular member are substantially flat.

53. The frame of claim 50 wherein said bent ends of said "X" shaped tubular members are each constrained between a pair of solid plates.

54. The frame of claim 53 wherein said first bent end portion is constrained between a first solid plate and a second solid plate, said first solid plate includes a bend having a radius of curvature that is less than a radius of curvature of a bend of said first bent end portion, said second solid plate includes a first bend that generally conforms to said first bent end portion and a second bend away from said bend of said first bent end portion.

55. A truck frame comprising:
   a) an "X" shaped tubular member having a first leg with a first bent end portion, a second leg with a second end bent away from said first end, a third leg with a third bent end portion and a fourth leg with a fourth end portion bent away from said third end portion;
   b) a first elongated tubular member having a first bent end portion adjacent to said first bent end portion of said first leg and a second bent end portion adjacent to said bent end portion of said third leg;
   c) a second elongated tubular member having a first bent end portion adjacent to said bent end portion of said second leg and a second bent end portion adjacent to said bent end portion of said fourth leg;
   d) a first pair of load absorbing plates, said first bent end portion of said first elongated member and said end portion of said first leg being constrained between said first pair of plates;
   e) a second pair of plates, said first bent end portion of said second elongated member and said end portion of said second leg being constrained between said second pair of plates;
   f) a third pair of load absorbing plates, said second bent end portion of said first elongated member and said end portion of said third leg being constrained between said third pair of plates;
   g) a fourth pair of load absorbing plates, said second bent end portion of said second elongated member and said end portion of said fourth leg being constrained between said fourth pair of plates;
   h) a first rail connected to said first pair of plates and said second pair of plates; and
   i) a second rail connected to said third pair of plates and said fourth pair of plates.

56. A vehicle frame comprising:
   a) a spaced pair of rails including first and second rails;
   b) an X-shaped crossmember comprising first and second tubular elements pivotally connected at locations near respective longitudinal centers of the elements;
   c) each of the elements have first and second spaced, curved end portions; and,
   d) end anchors securing the first end portion of said first and second tubular members respectively to said first rail and said end anchors securing the second end portion of said first and second tubular members to said second rail such that the X-shaped crossmember secures the rails in a fixed and spaced relationship.

57. A vehicle frame comprising:
   a) a spaced pair of rails;
   b) three X-shaped crossmembers each comprising a pair of tubular elements pivotally connected at locations near respective longitudinal centers fo the elements;
   c) each of the elements have spaced, curved end portions;
   d) end anchors securing the end portions respectively to the rails such that the X-shaped crossmembers secure the rails in spaced relationship;
   e) two of the members being oriented such that the pivotal axis is transversely oriented relative to the rails; and,
   f) the third member being positioned between the two members with its pivotal axis located longitudinally of the rails.

58. A motor vehicle having a frame, the frame comprising:
   a) a spaced pair of rails including first and second rails;
   b) an X-shaped crossmember comprising first and second tubular elements pivotally connected at locations near respective longitudinal centers of the elements;
   c) each of the elements have first and second spaced, curved end portions; and,
   d) end anchors securing the first end portion of said first and second tubular members respectively to said first rail and said end anchors securing the second end portion of said first and second tubular members to said second rail such that the X-shaped crossmember secures the rails in a fixed and spaced relationship.

59. A motor vehicle having a frame, the frame comprising:
   a) a first tubular member including a first bent end portion and a second end portion bent away from said first end portion;
   b) a second tubular member intersecting said first tubular member, said second member including a first bent end portion and a second end portion bent away from said first end portion, said second member being connected to said first member at the intersection of the first and second members;
   c) a third tubular member having a first bent end portion connected to said first bent end portion of said first tubular member and a second bent end portion connected to said second bent end portion of said second tubular member;
   d) a fourth tubular member having a first bent end portion connected to said first bent end portion of said second tubular member and a second bent end portion connected to said second bent end portion of said first tubular member;
   e) a first rail connected to said first end portion of said first member and said first end portion of said second member; and
   f) a second rail connected to said second end portion of said first member and said second end portion of said second member.

60. A motor vehicle having a frame, the frame comprising:
   a) a first substantially "S" shaped member having first and second end portions;
   b) a second substantially "S" shaped member having first and second end portions, said first and second members being connected at an intersection of said first and second members;
   c) a first substantially "C" shaped member having a first end portion connected to the first end portion of said first substantially "S" shaped member and a second end portion connected to said second end portion of said second substantially "S" shaped member;
   d) a second substantially "C" shaped member having a first end portion connected to said first end portion of said second substantially "S" shaped member and a second end portion connected to said second end portion of said first substantially "S" shaped member;
   e) a first rail connected to said first end portion of said first substantially "S" shaped member and said first end portion of said second substantially "S" shaped member; and
   f) a second rail connected to said second end portion of said first substantially "S" shaped member and said second end portion of said second substantially "S" shaped member.

61. A motor vehicle having a frame, the frame comprising:
   a) an "X" shaped tubular member comprising a first tubular member having a first leg with a first bent end portion, a second leg with a second end portion bent away from said first bent end portion, said first tubular member connected to a second tubular member having a third leg with a third bent end portion and a fourth leg with a fourth end portion bent away from said third end portion;
   b) a first elongated tubular member having a first end portion connected to said first leg and a second end portion connected to said third leg;
   c) a second elongated tubular member parallel to said first elongated tubular member having a first end portion constrained to said second leg and a second end portion connected to said fourth leg;
   d) a first rail connected to said first and second bent end portions of said "X" shaped member; and
   e) a second rail connected to said third and fourth bent end portions of said "X" shaped member.

62. A method of constructing a vehicle frame, comprising:
   a) spacing apart a pair of frame rails;
   b) pivotally connecting a pair of tubular elements at locations near respective longitudinal centers of the elements to form an X-shaped crossmember;
   c) connecting end anchor plates to each end portion of the tubular elements to connect each end portion to one of the frame rails such that the X-shaped crossmember secures the rails in a fixed and spaced apart relationship.

63. A method of connecting a tubular crossmember to rails of a vehicle frame, comprising:
   a) assembling an outer plate including a flat portion and a curved portion to an outer surface of an end portion of the tubular crossmember;
   b) assembling an inner plate including a flat portion and a curved portion to an inner surface of said end portion of the tubular crossmember such that said end portion is disposed between said inner and outer plates; and,
   c) fastening said inner and outer plates to said rails to form a vehicle frame.

64. A method of constructing a tubular crossmember, comprising:

a) pivotally connecting a first substantially "S" shaped member having first and second end portions to a second substantially "S" shaped member having first and second end portions;

b) connecting a first end portion of a first substantially "C" shaped member to said first end portion of said first substantially "S" shaped member;

c) connecting a second end portion of said first substantially "C" shaped member to said second end portion of said second substantially "S" shaped member;

d) connecting a first end portion of a second substantially "C" shaped member to said first end portion of said second substantially "S" shaped member; and, e) connecting a second end portion of said second substantially "C" shaped member to said second end portion of said first substantially "S" shaped member.

65. A crossmember for a vehicle frame having spaced apart rails, comprising:

a) an "X" shaped tubular member having a first leg with a first bent end portion, a second leg with a second end portion bent away from said first bent end portion, a third leg with a third bent end portion and a fourth leg with a fourth end portion bent away from said third end;

b) a first elongated tubular member having a first end portion connected to said first leg and a second end portion connected to said third leg;

c) a second elongated tubular member parallel to said first elongated tubular member having a first end portion constrained to said second leg and a second end portion connected to said fourth leg; and d) wherein said first and second tubular members are pivotally connected.

66. A crossmember for a vehicle frame having spaced apart rails, comprising:

a) an "X" shaped tubular member having a first leg with a first bent end portion, a second leg with a second end portion bent away from said first bent end portion, a third leg with a third bent end portion and a fourth leg with a fourth end portion bent away from said third end;

b) a first elongated tubular member having a first end portion connected to said first leg and a second end portion connected to said third leg;

c) a second elongated tubular member parallel to said first elongated tubular member having a first end portion constrained to said second leg and a second end portion connected to said fourth leg; and d) wherein said first bent end portion is constrained between a first solid plate and a second solid plate, said first solid plate includes a bend having a radius of curvature that is less than a radius of curvature of a bend of said first bent end, said second solid plate includes a first bend that generally conforms to said first bent end portion and a second bend away from said bend of said first bent end portion.

67. A truck frame comprising:

a) an "X" shaped tubular member having a first leg with a first bent end portion, a second leg with a second end portion bent away from said first bent end portion, a third leg with a third bent end portion and a fourth leg with a fourth end portion bent away from said third end portion;

b) a first elongated tubular member having a first end portion connected to said first leg and a second end portion connected to said third leg;

c) a second elongated tubular member parallel to said first elongated tubular member having a first end portion constrained to said second leg and a second end portion connected to said fourth leg;

d) a first rail connected to said first and second bent end portions of said "X" shaped member;

e) a second rail connected to said third and fourth bent end portions of said "X" shaped member and:

f) wherein said first and second tubular members that are pivotally connected.

68. A truck frame comprising:

a) an "X" shaped tubular member having a first leg with a first bent end portion, a second leg with a second end portion bent away from said first bent end portion, a third leg with a third bent end portion and a fourth leg with a fourth end portion bent away from said third end portion;

b) a first elongated tubular member having a first end portion connected to said first leg and a second end portion connected to said third leg;

c) a second elongated tubular member parallel to said first elongated tubular member having a first end portion constrained to said second leg and a second end portion connected to said fourth leg;

d) a first rail connected to said first and second bent end portions of said "X" shaped member;

e) a second rail connected to said third and fourth bent end portions of said "X" shaped member and:

f) wherein said first bent end portion is constrained between a first solid plate and a second solid plate, said first solid plate includes a bend having a radius of curvature that is less than a radius of curvature of a bend of said first bent end portion, said second solid plate includes a first bend that generally conforms to said first bent end portion and a second bend away from said bend of said first bent end portion.

* * * * *